(12) United States Patent
Sachdev et al.

(10) Patent No.: US 11,735,744 B2
(45) Date of Patent: Aug. 22, 2023

(54) METHOD AND APPARATUS FOR FABRICATING AN ELECTRODE FOR A BATTERY

(71) Applicant: GM GLOBAL TECHNOLOGY OPERATIONS LLC, Detroit, MI (US)

(72) Inventors: Anil K. Sachdev, Rochester Hills, MI (US); Leng Mao, Troy, MI (US); Louis G. Hector, Jr., Shelby Township, MI (US); Andrew C. Bobel, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 42 days.

(21) Appl. No.: 17/242,576

(22) Filed: Apr. 28, 2021

(65) Prior Publication Data
US 2022/0352523 A1  Nov. 3, 2022

(51) Int. Cl.
*H01M 4/74* (2006.01)
*H01M 4/38* (2006.01)
*H01M 4/134* (2010.01)
*H01M 50/531* (2021.01)
*H01M 4/66* (2006.01)
*H01M 4/04* (2006.01)
(Continued)

(52) U.S. Cl.
CPC ......... *H01M 4/747* (2013.01); *H01M 4/0404* (2013.01); *H01M 4/134* (2013.01); *H01M 4/1395* (2013.01); *H01M 4/382* (2013.01); *H01M 4/662* (2013.01); *H01M 4/667* (2013.01); *H01M 4/669* (2013.01); *H01M 10/052* (2013.01); *H01M 50/531* (2021.01); *H01M 2004/021* (2013.01)

(58) Field of Classification Search
CPC ...... H01M 4/747; H01M 4/74; H01M 4/0404; H01M 4/04; H01M 4/134; H01M 4/1395; H01M 4/382; H01M 4/662; H01M 4/667; H01M 4/669; H01M 4/66; H01M 4/745; H01M 4/043; H01M 4/0471; H01M 10/052; H01M 10/0525; H01M 50/531; H01M 2004/021

See application file for complete search history.

(56) References Cited

U.S. PATENT DOCUMENTS

2014/0147742 A1* 5/2014 Anastas ............ H01M 10/0525
429/211
2015/0191841 A1* 7/2015 Grant .................... H01M 4/139
205/59

(Continued)

FOREIGN PATENT DOCUMENTS

WO    WO-2013085509 A1 * 6/2013 .......... H01M 4/0404

*Primary Examiner* — Niki Bakhtiari
*Assistant Examiner* — Adam J Francis
(74) *Attorney, Agent, or Firm* — Quinn IP Law (57) ABSTRACT

A battery electrode, and a method for fabricating the battery electrode are described. The battery electrode includes a current collector having a woven mesh planar sheet that is composed of metallic strands. The metallic strands define a multiplicity of interstitial spaces, and the woven mesh planar sheet includes a first surface and a second surface. An active material including lithium is embedded in the interstitial spaces of a first portion of the woven mesh planar sheet, and an electrical connection tab arranged on a second portion of the woven mesh planar sheet.

15 Claims, 5 Drawing Sheets

(51) Int. Cl.
*H01M 4/1395* (2010.01)
*H01M 10/052* (2010.01)
*H01M 4/02* (2006.01)

(56) References Cited

U.S. PATENT DOCUMENTS

2018/0026271 A1* 1/2018 Oh .................... H01M 10/0525
  429/231.95
2018/0363154 A1* 12/2018 Swiegers .......... H01M 8/04276
2019/0198865 A1* 6/2019 Kim ...................... H01M 4/628
2019/0393480 A1* 12/2019 Brevnov ............... H01M 4/587

* cited by examiner

METHOD AND APPARATUS FOR FABRICATING AN ELECTRODE FOR A BATTERY

INTRODUCTION

Lithium ion battery packs may include one or multiple lithium ion battery cells that are electrically connected together in parallel or in series, depending upon the needs of the system. Each battery cell includes one or a plurality of lithium ion electrode pairs that are enclosed within a sealed pouch envelope. Each electrode pair includes a negative electrode (anode), a positive electrode (cathode), and a separator that physically separates and electrically isolates the negative and positive electrodes. To facilitate lithium ion mobility, an electrolyte that conducts lithium ions may be present within the separator. The electrolyte allows lithium ions to pass through the separator between the positive and negative electrodes to counterbalance the flow of electrons that, during charge and discharge cycles of the lithium ion battery cell, circumvent the separator and move between the electrodes through an external circuit. Depending on their chemistry, each lithium ion battery cell has a maximum or charging voltage (voltage at full charge) due to the difference in electrochemical potentials of the electrodes. For example, each lithium ion battery cell may have a charging voltage in the range of 3V to 5V and a nominal open circuit voltage in the range of 3.5V to 4V.

Each electrode pair is configured to electrochemically store and release electric power. Each negative electrode has a current collector with a negative foil coupled to a negative terminal tab, and each positive electrode has a current collector with a positive foil coupled to a positive terminal tab. Within each battery cell, the negative terminal tab electrically communicates with the negative current collectors that contact and exchange electrons with the negative electrodes of the electrode pairs, and the positive terminal tab electrically communicates with the positive current collectors that contact and exchange electrons with the positive electrodes of the electrode pairs. Lithium-ion battery cells are capable of being discharged and re-charged over many cycles.

There is a need to provide an improved current collector for an electrode.

SUMMARY

A battery electrode, and a method for fabricating the battery electrode are described. The concepts described herein provide for double-sided coating of a current collector with of lithium metal, with the coating happening from one side. In one embodiment, a copper or stainless steel mesh travels under a head that spreads a thixotropic paste of a lithium gel containing stabilized lithium powder. The paste is embedded into the mesh and travels under a heat source to evaporate the gel and melt the lithium powder to adhere to the mesh and fill the interstitial spaces in the mesh. The density of the paste is controlled such that the solidified lithium is slightly thinner than the mesh, allowing a proximal separator to contact the mesh but not the lithium. This attribute should retard dendrite formation. The mesh will also reinforce the lithium as well as interfere with dendrite growth.

The battery electrode includes a current collector having a woven mesh planar sheet that is composed of metallic strands. The metallic strands define a multiplicity of interstitial spaces, and the woven mesh planar sheet includes a first surface and a second surface. An active material including lithium is embedded in the interstitial spaces of a first portion of the woven mesh planar sheet, and an electrical connection tab arranged on a second portion of the woven mesh planar sheet.

An aspect of the disclosure includes an anti-oxidant material arranged as a coating on the woven mesh planar sheet.

Another aspect of the disclosure includes the woven mesh planar sheet being composed of metallic strands fabricated from one of stainless steel or a copper alloy.

Another aspect of the disclosure includes the woven mesh planar sheet being composed of metallic strands fabricated from one of silver, nickel, zinc, tin, and alloys based on these metals.

Another aspect of the disclosure includes a diameter of the metallic strands being within a range between 10 microns and 500 microns.

Another aspect of the disclosure includes the multiplicity of interstitial spaces defined by the metallic strands of the woven mesh planar sheet having a maximum opening size that is between one times and ten times the diameter of the metallic strands.

Another aspect of the disclosure includes the woven mesh planar sheet being composed of metallic strands and having a coating that disposed beneath the lithium that is embedded in the interstitial spaces.

Another aspect of the disclosure includes the coating being one of tin, nickel, or silver, or alloys thereof.

Another aspect of the disclosure includes the metallic strands of the woven mesh planar sheet having a coating that assists in securing the active material including lithium, which is embedded in the interstitial spaces to the woven mesh planar sheet.

Another aspect of the disclosure includes the metallic strands of the woven mesh planar sheet having flattened cross-sectional shapes.

Another aspect of the disclosure includes the metallic strands of the woven mesh planar sheet having one of a circular cross-sectional shape, a rectangular cross-sectional shape, or an oval cross-sectional shape.

Another aspect of the disclosure includes a method for fabricating a battery electrode that includes arranging a woven mesh planar sheet as a current collector, wherein the woven mesh planar sheet is a sheet composed of metallic strands defining a multiplicity of interstitial spaces. The method includes cleaning the woven mesh planar sheet, applying lithium onto a first surface of the woven mesh planar sheet, merging the lithium onto the woven mesh planar sheet such that the lithium is embedded in the interstitial spaces of the woven mesh planar sheet, joining the lithium onto the woven mesh planar sheet, and passivating the woven mesh planar sheet.

Another aspect of the disclosure includes bending longitudinal edges of the woven mesh planar sheet prior to the applying the lithium onto the first surface of the woven mesh planar sheet, and unbending the longitudinal edges of the woven mesh planar sheet subsequent to the joining of the lithium onto the woven mesh planar sheet.

Another aspect of the disclosure includes the woven mesh planar sheet being a sheet composed of metallic strands fabricated from stainless steel or a copper alloy.

Another aspect of the disclosure includes applying the lithium onto the first surface of the woven mesh planar sheet by applying a second sheet containing lithium onto the first surface of the woven mesh planar sheet and applying a compressive load thereto.

Another aspect of the disclosure includes applying the lithium onto the first surface of the woven mesh planar sheet by immersing the woven mesh planar sheet into a bath containing lithium, and removing, via a scraper, excess lithium from the first surface and a second surface of the woven mesh planar sheet.

Another aspect of the disclosure includes applying the lithium onto the first surface of the woven mesh planar sheet by preparing a lithium gel; applying the lithium gel onto the first surface of the woven mesh planar sheet via an applicator such that the lithium gel is embedded in the interstitial spaces of the woven mesh planar sheet; and removing excess amounts of the lithium gel from the first surface and a second surface of the woven mesh planar sheet.

Another aspect of the disclosure includes preparing the lithium gel as a thixotropic paste of a stabilized particulate including lithium.

Another aspect of the disclosure includes removing the excess amounts of the lithium gel from the first surface and the second surface of the woven mesh planar sheet by scraping the first surface and the second surface of the woven mesh planar sheet.

Another aspect of the disclosure includes coating the woven mesh planar sheet with one of tin, nickel, or silver prior to applying lithium onto the first surface of the woven mesh planar sheet.

Another aspect of the disclosure includes coating the woven mesh planar sheet with one of tin, nickel, or silver by immersing the woven mesh planar sheet in a bath including one of tin, nickel, or silver.

Another aspect of the disclosure includes warming the woven mesh planar sheet prior to the applying the lithium onto the first surface of the woven mesh planar sheet, wherein warming the woven mesh planar sheet includes heating the woven mesh planar sheet to a temperature of 180° C.

Another aspect of the disclosure includes joining the lithium onto the woven mesh planar sheet by heating the woven mesh planar sheet joined with the lithium to a temperature range between 180° C. to 200° C. for less than 30 minutes in a nitrogen atmosphere.

Another aspect of the disclosure includes cleaning the woven mesh planar sheet by applying a coating to the woven mesh planar sheet.

Another aspect of the disclosure includes passivating the woven mesh planar sheet by coating the woven mesh planar sheet with an anti-oxidant material.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

The appended drawings are not necessarily to scale, and present a somewhat simplified representation of various preferred features of the present disclosure as disclosed herein, including, for example, specific dimensions, orientations, locations, and shapes. Furthermore, some of the drawings may be described with reference to an xyz-reference frame for ease of understanding, which is illustrated in the various drawings and consistent between the various drawings. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity only, directional terms such as top, bottom, left, right, up, over, above, below, beneath, rear, and front, may be employed to assist in describing the drawings. These and similar directional terms are illustrative, and are not to be construed to limit the scope of the disclosure. Furthermore, the disclosure, as illustrated and described herein, may be practiced in the absence of an element that is not specifically disclosed herein.

Figure 1:
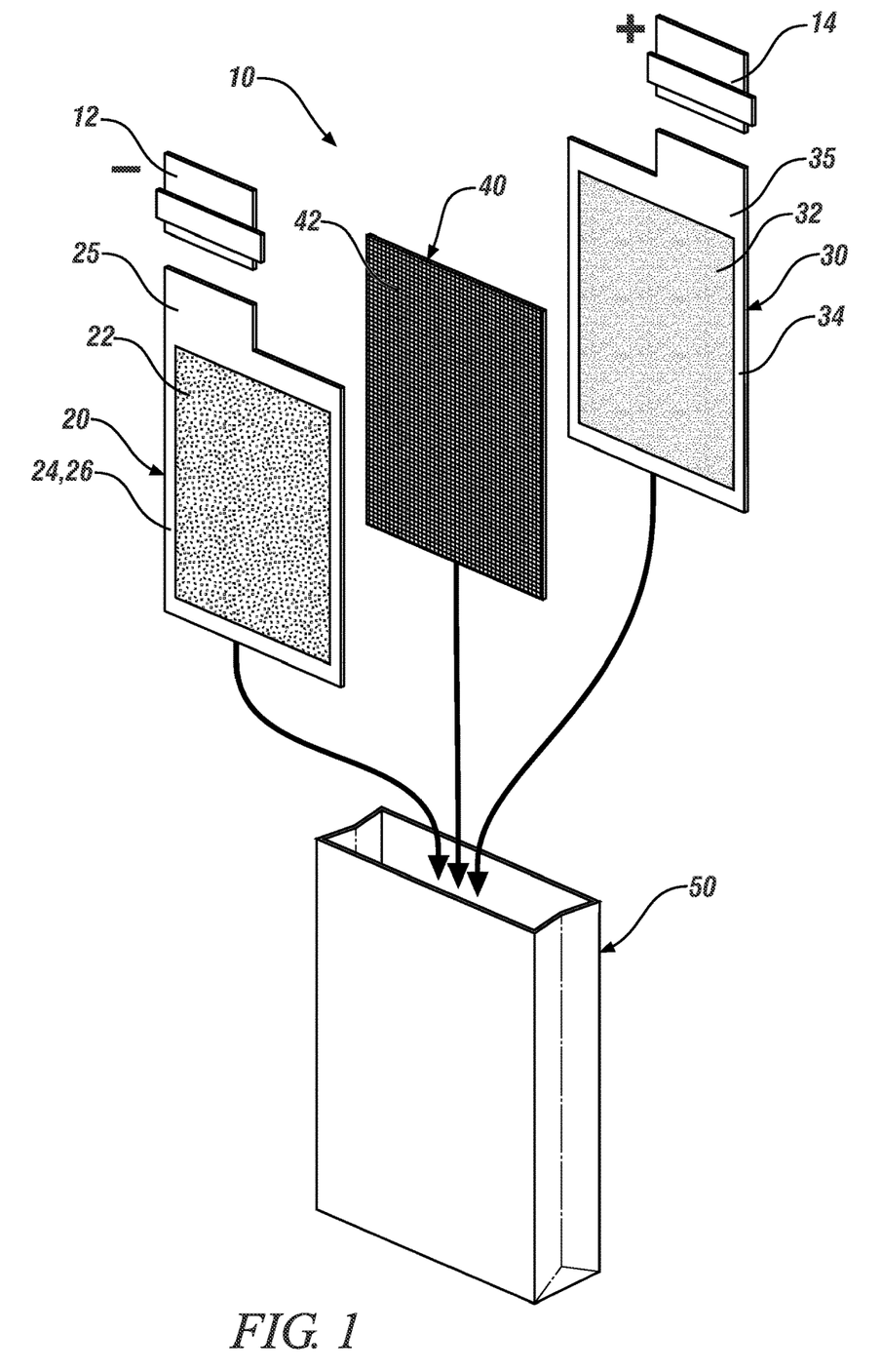
FIG. 1 schematically shows an exploded isometric view of a battery cell that includes positive and negative electrodes that are arranged in a stack, in accordance with the disclosure.

Referring to the drawings, wherein like reference numerals correspond to like or similar components throughout the several Figures, FIG. 1 schematically illustrates an exploded view of embodiment of a prismatically-shaped lithium ion battery cell 10 that includes an anode 20, a cathode 30 and a separator 40 that are arranged in a stack and sealed in a flexible pouch 50 containing an electrolytic material 42. A first, negative battery cell tab 12 and a second, positive battery cell tab 14 protrude from the flexible pouch 50. The anode 20 includes a first active material 22 that is arranged on an anode current collector 24, with the anode current collector 24 having a foil portion 25 that extends from the first active material 22 and is electrically and mechanically joined to the first battery cell tab 12. The cathode 30 includes a second active material 32 that is arranged on a cathode current collector 34, with the cathode current collector 34 having a foil portion 35 that extends from the second active material 32 and is electrically and mechanically joined to the second battery cell tab 14. A single pair of the anode 20, cathode 30 and separator 40 are illustrated. It is appreciated that multiple pairs of the anode 20, cathode 30 and separator 40 may be arranged and electrically connected in the flexible pouch 50, depending upon the specific application of the battery cell 10.

The separator 40 is arranged between the positive and negative electrodes 30, 20 to physically separate and electrically insulate the positive and negative electrodes 30, 20 from each other. The electrolytic material 42 that conducts lithium ions is contained within the separator 40 and is exposed to each of the positive and negative electrodes 30, 20 to permit lithium ions to move between the positive and negative electrodes 30, 20. Additionally, the negative electrode 20 contacts and exchanges electrons with the anode current collector 24, and the positive electrode 30 contacts and exchanges electrons with the cathode current collector 34.

The negative electrode 20 and the positive electrode 30 of each electrode pair are fabricated as electrode material that is able to intercalate and deintercalate lithium ions. The electrode materials of the positive and negative electrodes 30, 20 are formulated to store intercalated lithium at different electrochemical potentials relative to a common reference electrode, e.g., lithium. In the construct of the electrode pair, the negative electrode 20 stores intercalated lithium at a lower electrochemical potential (i.e., a higher energy state) than the positive electrode 30 such that an electrochemical potential difference exists between the positive and negative electrodes 30, 20 when the negative electrode 20 is lithiated. The electrochemical potential difference for each battery cell 10 results in a charging voltage in the range of 3V to 5V and nominal open circuit voltage in the range of 3.5V to 4.0V. These attributes of the negative and positive electrodes 30, 20 permit the reversible transfer of lithium ions between the positive and negative electrodes 30, 20 either spontaneously (discharge phase) or through the application of an external voltage (charge phase) during operational cycling of the electrode pair. The thickness of each positive and negative electrode 30, 20 ranges between 30 um and 150 um.

The negative electrode 20 is a lithium host material such as, for example, graphite, silicon, or lithium titanate. The lithium host material may be intermingled with a polymeric binder material to provide the negative electrode 20 with structural integrity and, optionally, a conductive fine particle diluent. The lithium host material is preferably graphite and the polymeric binder material is preferably one or more of polyvinylidene fluoride (PVdF), an ethylene propylene diene monomer (EPDM) rubber, styrene butadiene rubber (SBR), a carboxymethyl cellulose (CMC), polyacrylic acid, or mixtures thereof. Graphite is normally used to make the negative electrode 20 because, in addition to being relatively inert, its layered structure exhibits favorable lithium intercalation and deintercalation characteristics that help provide the battery electrode pair with a desired energy density. Various forms of graphite that may be used to construct the negative electrode 20 are commercially available. The conductive diluent may be very fine particles of, for example, high-surface area carbon black.

The positive electrode 30 is composed as a lithium-based active material that stores intercalated lithium at a higher electrochemical potential (relative to a common reference electrode) than the lithium host material used to make the negative electrode 20. The same polymeric binder materials (PVdF, EPDM, SBR, CMC, polyacrylic acid) and conductive fine particle diluent (high-surface area carbon black) that may be used to construct the negative electrode 20 may also be intermingled with the lithium-based active material of the positive electrode 30 for the same purposes. The lithium-based active material is preferably a layered lithium transition metal oxide, such as lithium cobalt oxide, a spinel lithium transition metal oxide, such as spinel lithium manganese oxide, a lithium polyanion, such as a nickel-manganese-cobalt oxide, lithium iron phosphate, or lithium fluorophosphate. Some other suitable lithium-based active materials that may be employed as the lithium-based active material include lithium nickel oxide, lithium aluminum manganese oxide, and lithium vanadium oxide, to name examples of alternatives. Mixtures that include one or more of these recited lithium-based active materials may also be used to make the positive electrode 30.

The separator 40 is composed as one or more porous polymer layers that, individually, may be composed of any of a wide variety of polymers. Only one such polymer layer is shown here for simplicity. Each of the one or more polymer layers may be a polyolefin. Some specific examples of a polyolefin are polyethylene (PE) (along with variations such as HDPE, LDPE, LLDPE, and UHMWPE), polypropylene (PP), or a blend of PE and PP. The polymer layer(s) function to electrically insulate and physically separate the negative and positive electrodes 20, 30. The separator 40 may further be infiltrated with a liquid electrolyte throughout the porosity of the polymer layer(s). The liquid electrolyte, which also wets both electrodes 20, 30, preferably includes a lithium salt dissolved in a non-aqueous solvent. The separator 40 has a thickness that may be between 10 um to 50 um.

The descriptions set forth above pertaining to the negative electrode 20, the positive electrode 30, the separator 40, and the electrolytic material 13 included within the separator 40 are intended to be non-limiting examples. Many variations on the chemistry of each of these elements may be applied in the context of the lithium ion battery cell 10 of the present disclosure. For example, the lithium host material of the negative electrode 20 and lithium-based active material of the positive electrode 30 may be compositions other than those specific electrode materials listed above, particularly as lithium ion battery electrode materials continue to be researched and developed. Additionally, the polymer layer(s) and/or the electrolyte contained within the polymer layer(s) of the separator 40 may also include other polymers and electrolytes than those specifically listed above. In one variation, the separator 40 may be a solid polymer electrolyte that includes a polymer layer—such polyethylene oxide (PEO), polypropylene oxide (PPO), polyacrylonitrile (PAN), or polyvinylidene fluoride (PVdF) having a lithium salt or swollen with a lithium salt solution. The electrode pair reversibly exchanges lithium ions through the separator 40 and a flow of electrons around the separator 40 during applicable discharge and charge cycles.

The anode and cathode current collectors 24, 34 are thin metallic plate-shaped elements that contact their respective first and second active materials 22, 32 over an appreciable interfacial surface area. The purpose of the anode and cathode current collectors 24, 34 is to exchange free electrons with their respective first and second active materials 22, 32 during discharging and charging.

The cathode current collector 34 is a planar sheet that is fabricated from aluminum or an aluminum alloy, and has a thickness at or near 0.2 mm.

Figure 2:
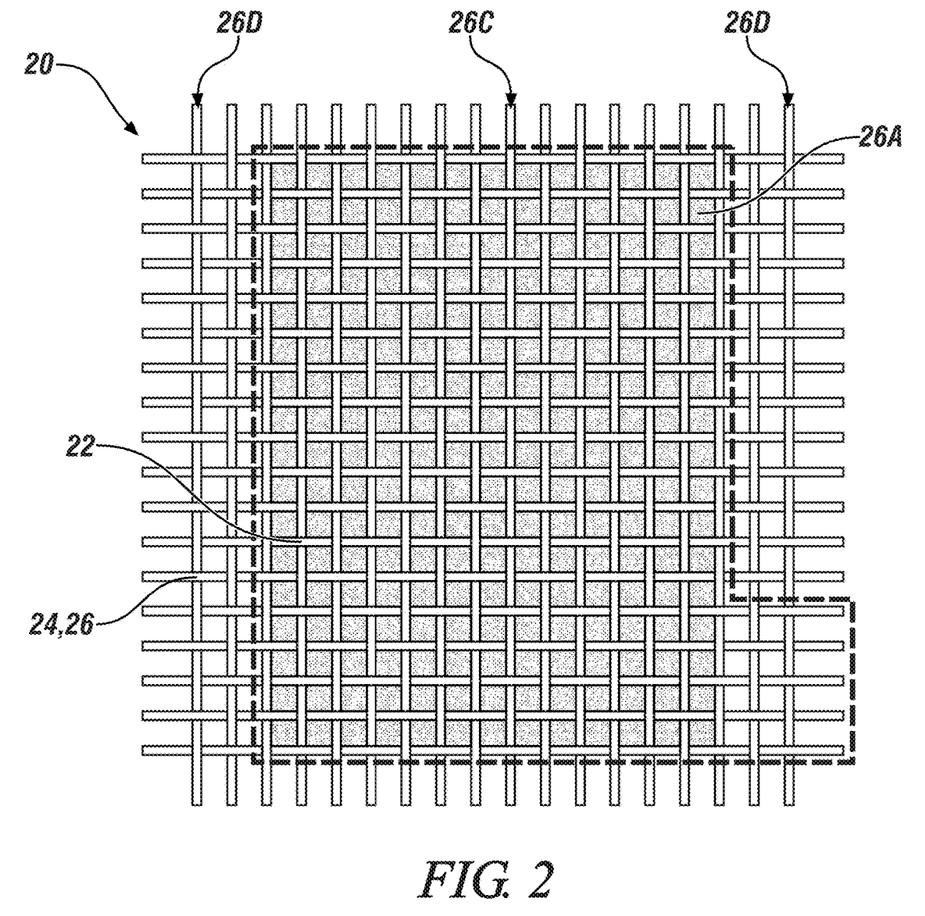
FIG. 2 schematically shows a plan view of an embodiment of an electrode for a battery cell, in accordance with the disclosure.

As illustrated with reference to FIG. 2, the anode current collector 24 is composed of a multiplicity of metallic strands 27 that are woven to form a woven mesh planar sheet 26 that defines a multiplicity of interstitial spaces 28 in the form of gaps, voids, etc. The woven mesh planar sheet 26 is rectangularly-shaped in one embodiment, and has a first, top surface 26A a second, bottom surface 26B (illustrated with reference to FIG. 6), a center portion 26C, and leftward and rightward longitudinal edges 26D. Alternatively, the woven mesh planar sheet 26 may be circularly-shaped, or another shape that conforms to a specific application need. The metallic strands 27 are fabricated from stainless steel, copper, a copper alloy, a nickel-coated copper, or another material and are woven to form the woven mesh planar sheet 26. In one embodiment, the metallic mesh planar sheet 26 has a thickness at or near 0.2 mm.

The diameter of the metallic strands 27 ranges between 10 microns and 20 microns, and the multiplicity of interstitial spaces 28 defined by the metallic strands 27 of the woven mesh planar sheet 26 have maximum opening sizes that may range between a factor of one times and ten times the diameter of the metallic strands 27. The metallic strands 27 have a circular cross-section in one embodiment. Alternatively, the metallic strands 27 have a rectangular cross-section. Alternatively, the metallic strands 27 have an oval cross-section. Alternatively, the metallic strands 27 have circular cross-sections that have been flattened by a compressive force after having been woven into the woven mesh planar sheet 26. In one embodiment, the metallic strands 27 of the woven mesh planar sheet 26 have a coating 29 that assists in securing the active material 22 embedded in the interstitial spaces 28 to the woven mesh planar sheet 26.

The coating 29 may be applied onto the strands 27 prior to being fabricated into the woven mesh planar sheet 26 in one embodiment. Alternatively, the coating 29 may be applied onto the woven mesh planar sheet 26. In one embodiment, the coating 29 is one of tin, nickel, or silver, or alloys thereof. Alternatively, the coating 29 may be metals (e.g., Ni, Zn, Sn, Au, Ag, Cu) and their Li-intermetallic phase, metal oxides (e.g., ZnO, CuO, Al2O3, SiO2, etc), nitrogen-doped graphite, carbon nitrite, and polymer materials such as PEO-based polymer, Lithium Lanthanum Titanate (LLTO), Lithium Lanthanum Zirconate (LLZO), Lithium Aluminum Titanium Phosphate (LATP), Lithium Phosphorus Sulfide (LPS), Lithium Phosphorus Sulfur Chloride Iodide (LPSCl), among others.

Figure 3:
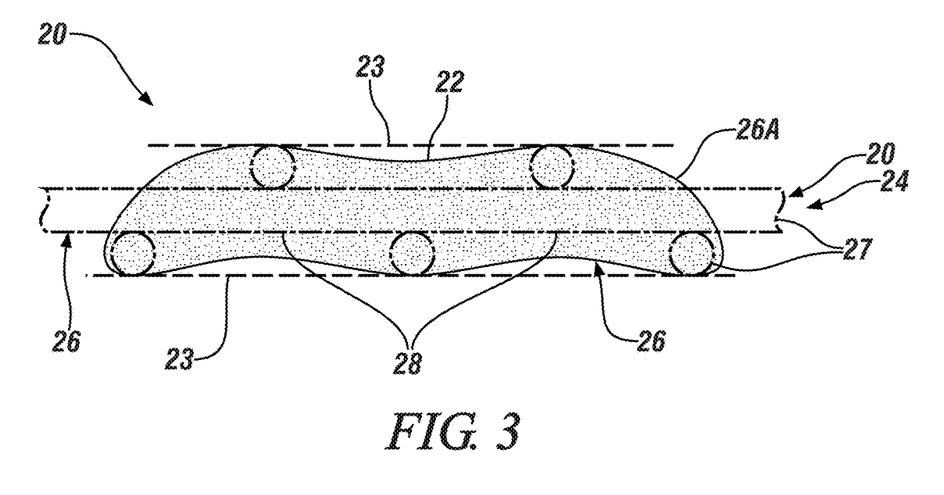
FIG. 3 schematically shows an end view of an embodiment of an electrode for a battery cell, in accordance with the disclosure.

FIG. 3 schematically illustrates an end view of an embodiment of the anode 20 including the anode current collector 24 composed of a multiplicity of metallic strands 27 that are woven to form a woven mesh planar sheet 26 that defines a multiplicity of interstitial spaces 28, with the active material 22 embedded in the interstitial spaces 28 of the woven mesh planar sheet 26. The surface of the active material 22 is arranged so that it does not extend outside of an outer plane 23, which is a mesh height that is defined by an outer portion of the woven mesh planar sheet 26 on both the first (top) surface 26A or the second (bottom) surface 26B.

FIGS. 4A through 4H pictorially depict examples of embodiments of woven mesh planar sheets 26 that define a multiplicity of interstitial spaces 28. The multiplicity of interstitial spaces 28 are shown between the weavings in each of the Figures.

The wettability of the active material 22 onto the woven mesh planar sheet 26 can be tuned by tuning parameters of the wire mesh, including tuning the wire mesh pitch, the strand diameter, the strand cross-section shape, the strain orientation, and mesh topology, i.e., woven mesh or knitted mesh. The size of the interstitial spaces 28 in the grid affects capillary forces and the ability to embed and join the applied lithium: if the gaps are too large, molten lithium may droop or fall out; if too narrow, there may be a need for an aggressive wetting agent to achieve sufficient coverage of the lithium onto the woven mesh planar sheet 26.

Figure 4A:
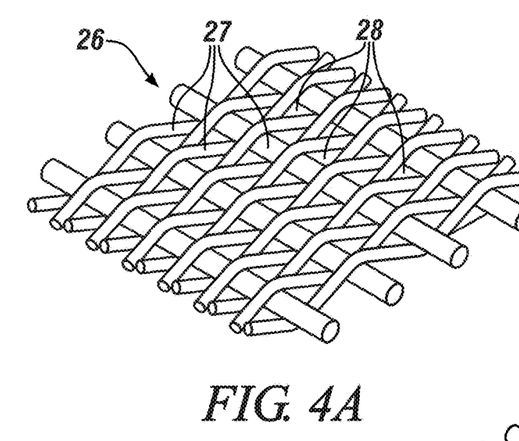
FIGS. 4A-4H schematically show isometric views of portions of collectors for electrodes for battery cells, in accordance with the disclosure.

FIG. 4A pictorially illustrates an embodiment of the woven mesh planar sheet 26 wherein the metallic strands 27 are arranged in a plain dutch weave.

Figure 4B:
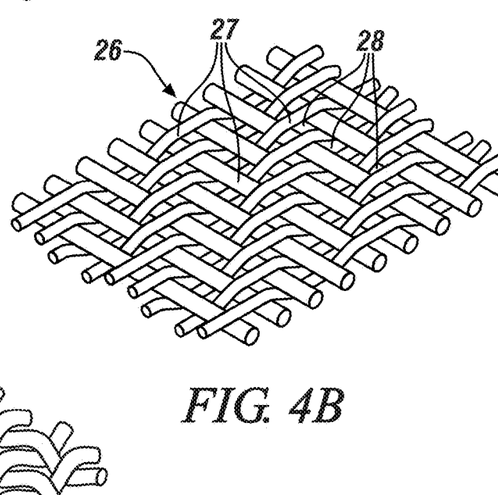

FIG. 4B pictorially illustrates an embodiment of the woven mesh planar sheet 26 wherein the metallic strands 27 are arranged in a twill weave.

Figure 4C:
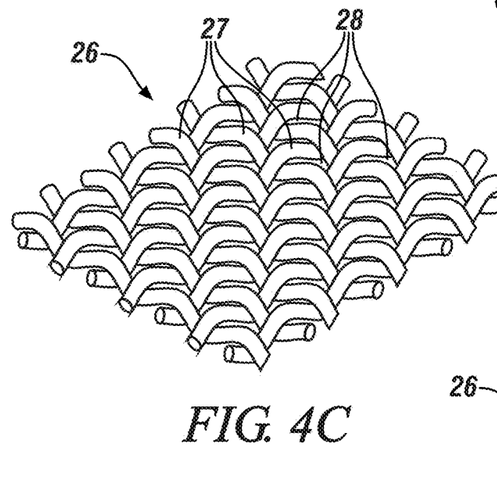

FIG. 4C pictorially illustrates an embodiment of the woven mesh planar sheet 26 wherein the metallic strands 27 are arranged in a plain weave.

Figure 4D:
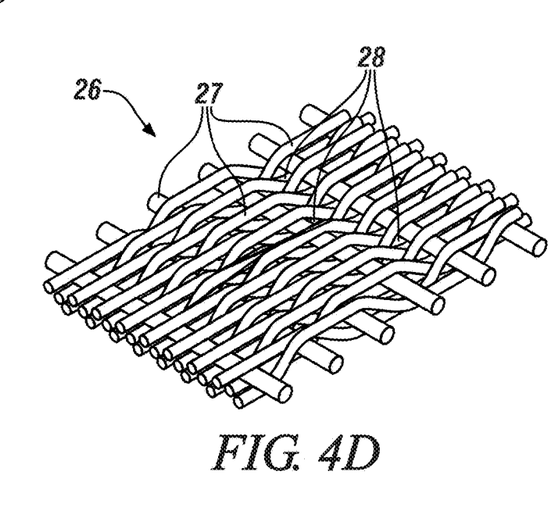

FIG. 4D pictorially illustrates an embodiment of the woven mesh planar sheet 26 wherein the metallic strands 27 are arranged in a twill dutch weave.

Figures 4E, 4F, 4G, 4H:
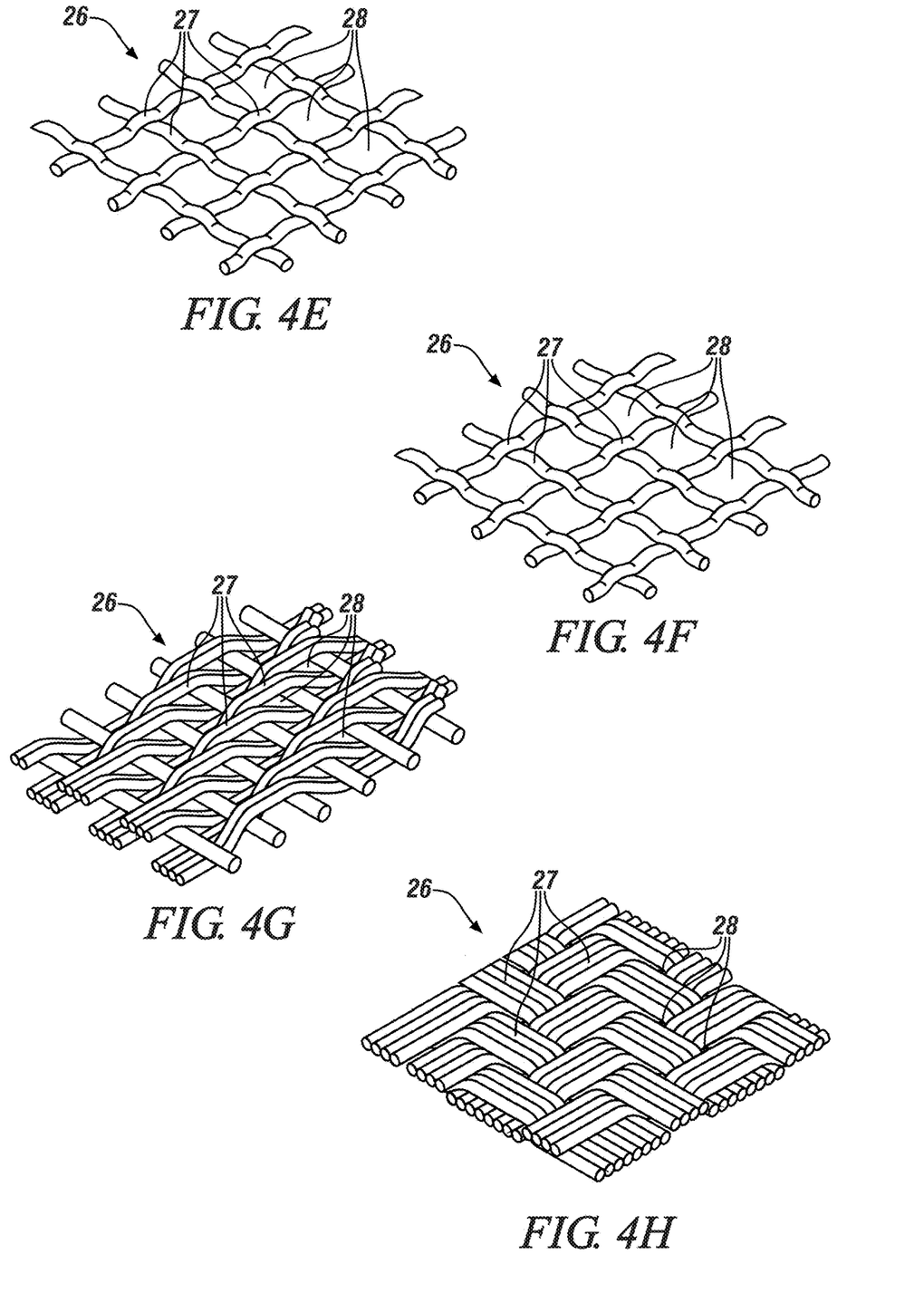

FIG. 4E pictorially illustrates an embodiment of the woven mesh planar sheet 26 wherein the metallic strands 27 are arranged in a lock crimp weave.

FIG. 4F pictorially illustrates an embodiment of the woven mesh planar sheet 26 wherein the metallic strands 27 are arranged in an inter-cramp weave.

FIG. 4G pictorially illustrates an embodiment of the woven mesh planar sheet 26 wherein the metallic strands 27 are arranged in a twill dutch double weave.

FIG. 4H pictorially illustrates an embodiment of the woven mesh planar sheet 26 wherein the metallic strands 27 are arranged in a stranded weave.

Figure 5A:
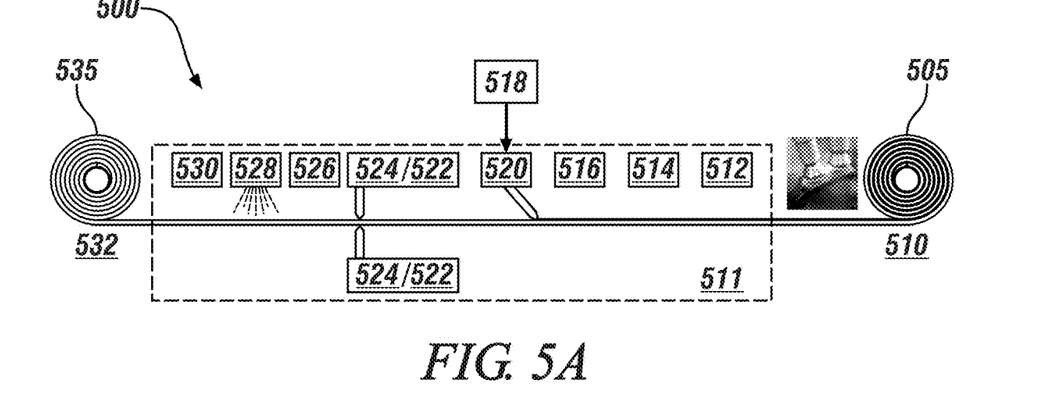
FIG. 5A pictorially shows an embodiment of a process for fabricating an electrode for a battery cell, in accordance with the disclosure.

FIG. 5A schematically illustrates an embodiment of an anode fabrication process 500 for forming an embodiment of the anode 20 that is described with reference to FIGS. 1-3, wherein the anode 20 includes the anode current collector 24 composed of a multiplicity of metallic strands 27 that are woven to form a woven mesh planar sheet 26 that defines a multiplicity of interstitial spaces 28, with the active material 22 being embedded in the interstitial spaces 28 of the woven mesh planar sheet 26 and joined to the woven mesh planar sheet 26. In one embodiment, and as described herein, the active material 22 is prepared as a gel, referred to as a lithium gel 22A.

Raw material is fed from a spool 505 or another feed mechanism into processing equipment for the anode fabrication process (process) 500, wherein the raw material is woven mesh material that is used for the woven mesh planar sheet 26. The woven mesh planar sheet 26 is subjected to a cleaning step (Step 510) to remove debris and other materials from its surfaces prior to passing into an environmental chamber 511 that provides an atmosphere that is inert to lithium. In one embodiment, the atmosphere in the environmental chamber 511 is free from oxygen. In one embodiment, the atmosphere in the environmental chamber 511 is argon.

After entering the environmental chamber 511, longitudinal edges 26D of the woven mesh planar sheet 26 are subjected to bending (Step 512) in one embodiment. The longitudinal edges 26D and associated bending is described with reference to FIG. 6.

Referring again to FIG. 5, the woven mesh planar sheet 26 is then subjected to warming (Step 514), prior to the applying the lithium gel 22A onto a first surface 26A of the woven mesh planar sheet 26, wherein warming the woven mesh planar sheet includes heating the woven mesh planar sheet to a temperature of that is at or near 180 C.

Following the warming (Step 514), the woven mesh planar sheet 26 is coated with the coating 29 (Step 516). This may include coating the woven mesh planar sheet 26 with tin, nickel, or silver, or an alloys thereof, prior to applying lithium onto the first surface of the woven mesh planar sheet. The addition of the coating 29 is intended to remove oxidized metal from the surfaces, seal out air thus preventing further oxidation, and facilitate amalgamation by improving surface wetting characteristics. The coating 29 also protects the metal surfaces from re-oxidation during soldering and helps the soldering process by altering the surface tension of the molten solder. As previously described, the coating 29 is composed of a base material and an activator which is the chemical that promotes better wetting of the solder by removing oxides from the metal surface. The coating process (Step 516) improves the wettability of the surfaces of the woven mesh planar sheet 26 in relation to the subsequently applied lithium gel 22A.

The coating process (Step 516) may be accomplished by immersing the woven mesh planar sheet 26 in a bath including one of tin, nickel, or silver, or an alloy thereof, or by a process of flash plating. Alternatively, the coating process (Step 516) may be accomplished by applying the coating 29 onto the surface 26A. Alternatively, the coating 29 may be applied to the woven mesh planar sheet 26 and/or the individual wires thereof during fabrication of the woven mesh planar sheet 26.

The coating material may any one of or combinations of metals (Ni, Zn, Sn, Au, Ag, Cu) and their Li-intermetallic phase, metal oxides (ZnO, CuO, Al2O3, SiO2, etc), Nitrogen-doped graphite, carbon nitrite, and polymer materials such as PEO-based polymer, Lithium Lanthanum Titanate (LLTO), Lithium Lanthanum Zirconate (LLZO), Lithium Aluminum Titanium Phosphate (LATP), Lithium Phosphorus Sulfide (LPS) Lithium Phosphorus Sulfur Chloride Iodide (LPSCl), etc.)

The lithium gel 22A is prepared, in one embodiment, as a thixotropic paste of having a stabilized particulate including lithium (Step 518).

The lithium gel 22A is applied onto the first, top surface 26A of the woven mesh planar sheet (520), and then the lithium gel 22A is merged onto the woven mesh planar sheet such that the lithium gel 22A is embedded in the interstitial spaces 28 of the woven mesh planar sheet 26 and deposited onto the surfaces of individual strands 27 of the woven mesh planar sheet 26 (Step 522). The lithium gel 22A may be applied via an applicator brush, or via immersion in a bath, or via a two sided roller to ensure all surfaces of the woven mesh planar sheet are wetted, and to control the thickness of the lithium gel 22A. Alternatively, the lithium is applied to the first surface 26A of the woven mesh planar sheet by preparing and applying a second sheet containing lithium onto the first surface of the woven mesh planar sheet and applying a compressive load thereto to embed the lithium into the interstitial spaces 28 of the woven mesh planar sheet 26 and deposited onto the surfaces of individual strands 27 of the woven mesh planar sheet 26.

The lithium gel 22A is applied onto the surfaces of the woven mesh planar sheet with the thickness of the lithium gel 22A being controlled so that the lithium gel 22A is suspended in the mesh of the woven mesh planar sheet 26 on both the first surface 26A and the second surface 26B and at or below the mesh height defined by the outer planes 23, as shown and described with reference to FIG. 3.

Referring again to FIG. 5A, excess amounts of the lithium gel 22A is removed from the first surface 26A and the second surface 26B of the woven mesh planar sheet 26 by mechanically scraping the first and second surfaces with a scraper, a spatula, or another tool (Step 524). This step is executed to achieve an exact thickness of the lithium gel 22A on the woven mesh planar sheet 26, thus controlling its thickness.

Following the removal of excess lithium (Step 524), the applied and embedded lithium is joined, i.e., fused or bonded, onto the woven mesh planar sheet 26 by applying heat to the woven mesh planar sheet 26 to evaporate the gel portion of the lithium gel 22A and melt the lithium powder to fuse with, adhere to or otherwise bond with the mesh in the woven mesh planar sheet 26 in the interstitial spaces 28 (Step 526). Heating the woven mesh planar sheet 26 to join the lithium includes heating, in the inert environment, the woven mesh planar sheet 26 to a temperature that is in a temperature range between 180° C. and 200° C. for 30 minutes or less. Heating may be accomplished by a thermoelectric furnace, an infrared heat source, a resistance heating device, an induction heating device, or another heat generating device.

Following the heating step (Step 526), the woven mesh planar sheet is subjected to passivation (Step 528), which includes applying an anti-oxidant material, such as a polymer substance, to the first and second surfaces 26A, 26B to avoid lithium oxidation. The passivation step (step 528) includes, in one embodiment, applying the anti-oxidant material in a spray form that is delivered by a sprayer (not shown). The temperature of the spray from the sprayer can be controlled to controllably cool the woven mesh planar sheet 26 with the lithium to manage physical contraction of the lithium and the woven mesh planar sheet 26, thus minimizing or preventing distortion of the woven mesh planar sheet 26 and minimizing or preventing separation of the lithium from the woven mesh planar sheet 26.

Following the passivation step (Step 528), the previously bent longitudinal edges from step 512 are unbent and straightened of the lithium has solidified (Step 530), and the final workpiece is removed from the environmental chamber 511 and formed (Step 532) onto a spool 535 or otherwise captured for future processing.

Figure 5B:
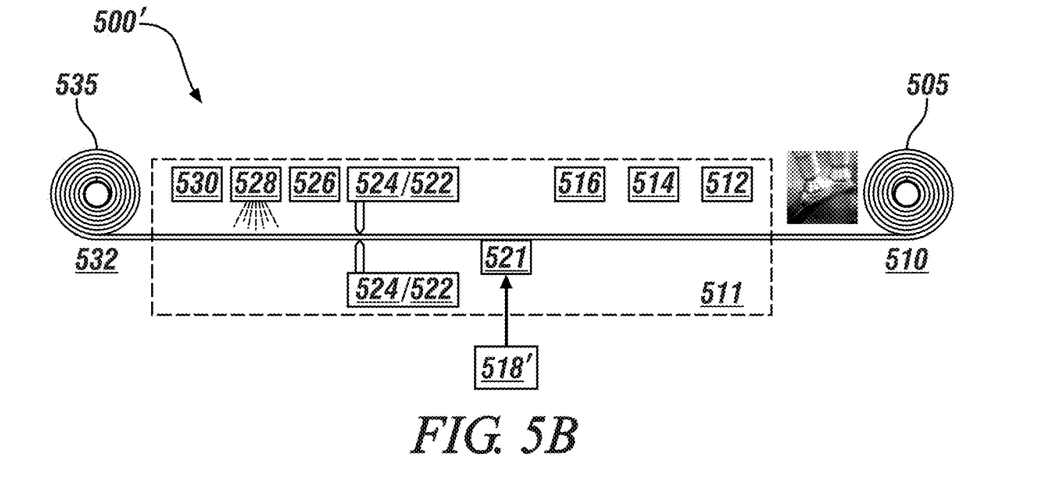
FIG. 5B pictorially shows another embodiment of a process for fabricating an electrode for a battery cell, in accordance with the disclosure.

FIG. 5B schematically illustrates another embodiment of the anode fabrication process 500' for forming an embodiment of the anode 20 that is described with reference to FIGS. 1-3, wherein the anode 20 includes the anode current collector 24 composed of a multiplicity of metallic strands 27 that are woven to form the woven mesh planar sheet 26 that defines a multiplicity of interstitial spaces 28, with the active material 22 being embedded in the interstitial spaces 28 of the woven mesh planar sheet 26 and joined to the woven mesh planar sheet 26. In this embodiment of the anode fabrication process 500', the lithium gel 22A is prepared as a low viscosity gel or liquid (Step 518') and contained in a molten metal bath. The lithium gel 22A is applied onto the second, bottom surface 26B of the woven mesh planar sheet 26 by having the woven mesh planar sheet 26 ride across and skim a surface of the molten metal bath (521), with the lithium gel 22A being drawn onto the surfaces of the woven mesh planar sheet 26 and into the multiplicity of interstitial spaces 28 by capillary action that is facilitated by the coating 29. The lithium gel 22A is merged onto the woven mesh planar sheet 26 such that the lithium is embedded in the interstitial spaces 28 of the woven mesh planar sheet 26 and deposited onto the surfaces of individual strands 27 of the woven mesh planar sheet 26 (Step 522). The other steps of this embodiment of the anode fabrication process 500' essentially the same as the anode fabrication process 500 that is described with reference to FIG. 5A.

Figure 6:
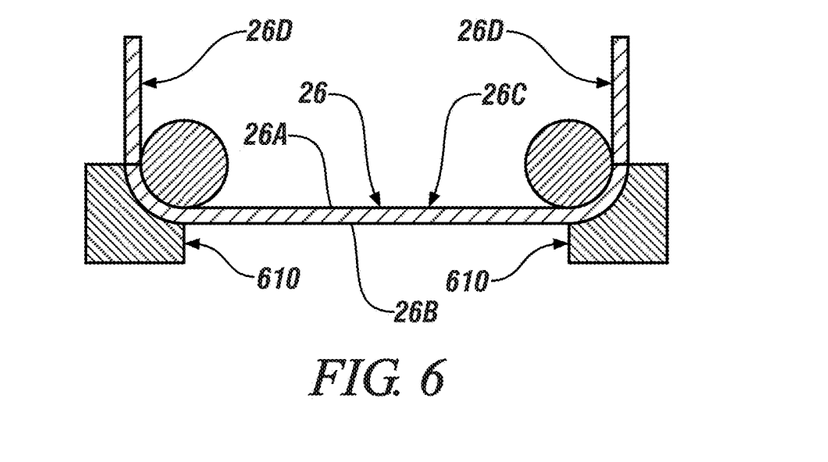
FIG. 6 pictorially shows an embodiment of a portion of a process for fabricating an electrode for a battery cell, in accordance with the disclosure.

FIG. 6 schematically shows an end view of a portion of an embodiment of the woven mesh planar sheet 26 as it passes through a bending device 610, which is part of Step 512 that is described with reference to FIGS. 5A and 5B. The bending device 610 bends the leftward and rightward longitudinal edges 26D of the woven mesh planar sheet 26 to be orthogonal to a plane defined by a center portion 26C of the woven mesh planar sheet 26. The purpose of the bending of the leftward and rightward longitudinal edges 26D of the woven mesh planar sheet 26 is to discourage or prevent flow of molten lithium thereto during the steps of applying the lithium onto the first, top surface 26A of the woven mesh planar sheet (Step 520 of FIG. 5A), and merging the lithium onto the woven mesh planar sheet 20 (Step 522 of FIGS. 5A and 5B). The molten lithium lacks sufficient capillary action to travel upwards, and thus the leftward and rightward longitudinal edges 26D of the woven mesh planar sheet 26 are uncoated by the lithium, and can be completely trimmed, or cut to form the foil portion 25 and the first battery cell tab 12 that extends from the first active material 22 after having been straightened (Step 530 of FIGS. 5A and 5B).

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for fabricating a battery electrode, the method comprising:
    arranging a woven mesh planar sheet as a current collector, wherein the woven mesh planar sheet is a sheet composed of metallic strands defining a multiplicity of interstitial spaces;
    cleaning the woven mesh planar sheet;
    bending longitudinal edges of the woven mesh planar sheet;
    applying lithium onto a first surface of the woven mesh planar sheet;
    merging the lithium onto the woven mesh planar sheet such that the lithium is embedded in the interstitial spaces of the woven mesh planar sheet;
    joining the lithium onto the woven mesh planar sheet;
    unbending the longitudinal edges of the woven mesh planar sheet;
    trimming the longitudinal edges of the woven mesh planar sheet; and
    passivating the woven mesh planar sheet.

2. The method of claim 1, wherein the woven mesh planar sheet comprises a sheet composed of metallic strands fabricated from stainless steel or a copper alloy.

3. The method of claim 1, wherein applying the lithium onto the first surface of the woven mesh planar sheet comprises immersing the woven mesh planar sheet into a bath containing lithium, and removing, via a scraper, excess lithium from the first surface and a second surface of the woven mesh planar sheet.

4. The method of claim 1, wherein applying the lithium onto the first surface of the woven mesh planar sheet comprises:
    preparing a lithium gel;
    applying, via an applicator, the lithium gel onto the first surface of the woven mesh planar sheet such that the lithium gel is embedded in the interstitial spaces of the woven mesh planar sheet; and
    removing excess amounts of the lithium gel from the first surface and a second surface of the woven mesh planar sheet.

5. The method of claim 4, wherein preparing the lithium gel comprises preparing the lithium gel as a thixotropic paste of a stabilized particulate including lithium.

6. The method of claim 4, wherein removing the excess amounts of the lithium gel from the first surface and the second surface of the woven mesh planar sheet comprises mechanically scraping the first surface and the second surface of the woven mesh planar sheet.

7. The method of claim 1, further comprising coating the woven mesh planar sheet with one of tin, nickel, or silver prior to applying lithium onto the first surface of the woven mesh planar sheet.

8. The method of claim 7, wherein coating the woven mesh planar sheet with one of tin, nickel, or silver comprises immersing the woven mesh planar sheet in a bath including one of tin, nickel, or silver.

9. The method of claim 1, further comprising warming the woven mesh planar sheet prior to the applying the lithium onto the first surface of the woven mesh planar sheet, wherein warming the woven mesh planar sheet comprises heating the woven mesh planar sheet to a temperature of 180 C.

10. The method of claim 1, wherein joining the lithium onto the woven mesh planar sheet comprises heating the woven mesh planar sheet joined with the lithium to a temperature range between 180 C to 200 C for less than 30 minutes in a nitrogen atmosphere.

11. The method of claim 1, wherein cleaning the woven mesh planar sheet comprises applying a coating to the woven mesh planar sheet.

12. The method of claim 1, wherein passivating the woven mesh planar sheet comprises coating the woven mesh planar sheet with an anti-oxidant material.

13. The method of claim 1, further comprising applying the lithium in a gel form onto the first surface of the woven mesh planar sheet.

14. The method of claim 1, further comprising applying the lithium in gel form contained in a molten metal bath onto the first surface of the woven mesh planar sheet.

15. The method of claim 1, further comprising merging the lithium onto the woven mesh planar sheet such that the lithium is drawn onto the interstitial spaces of the woven mesh planar sheet by capillary action.

* * * * *